Figure 1:
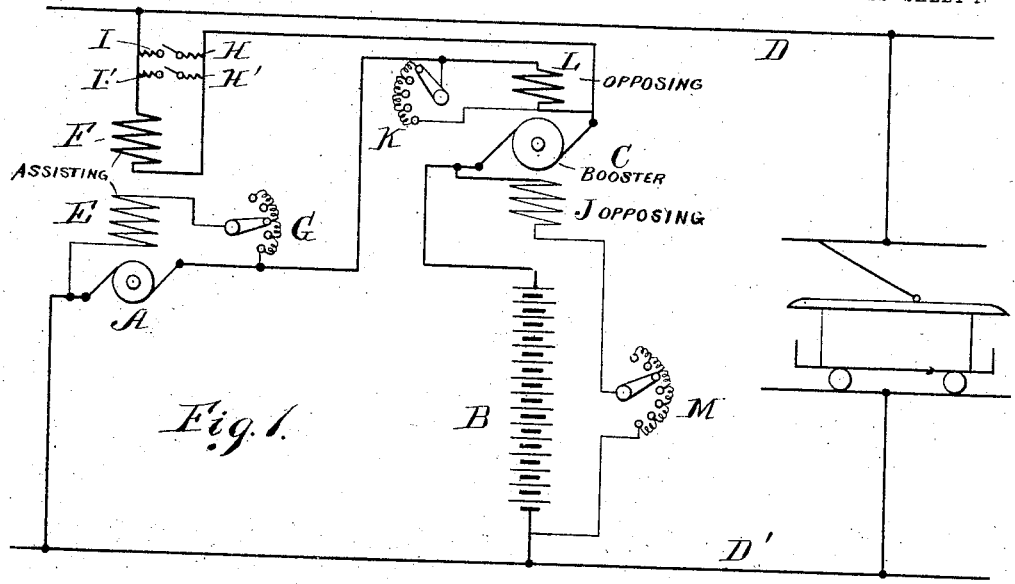

No. 826,429. PATENTED JULY 17, 1906.
A. S. HUBBARD & E. LYNDON.
SELF REGULATING SYSTEM OF ELECTRICAL DISTRIBUTION.
APPLICATION FILED NOV. 3, 1903.

3 SHEETS—SHEET 1.

Witnesses
Henry C. Workman

Albert S. Hubbard and
Edward Lyndon
Inventors
By their Attorneys

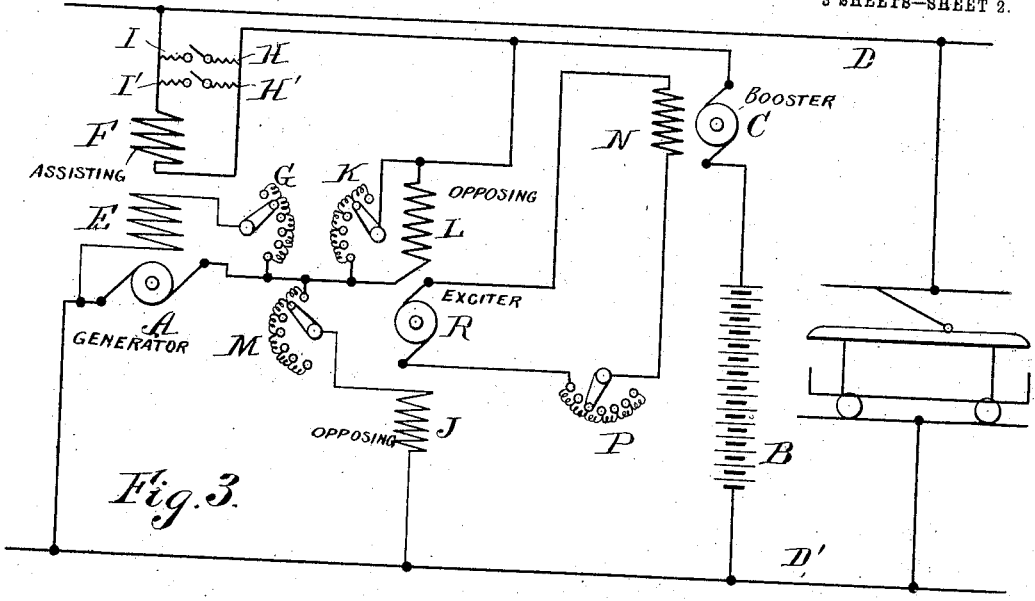
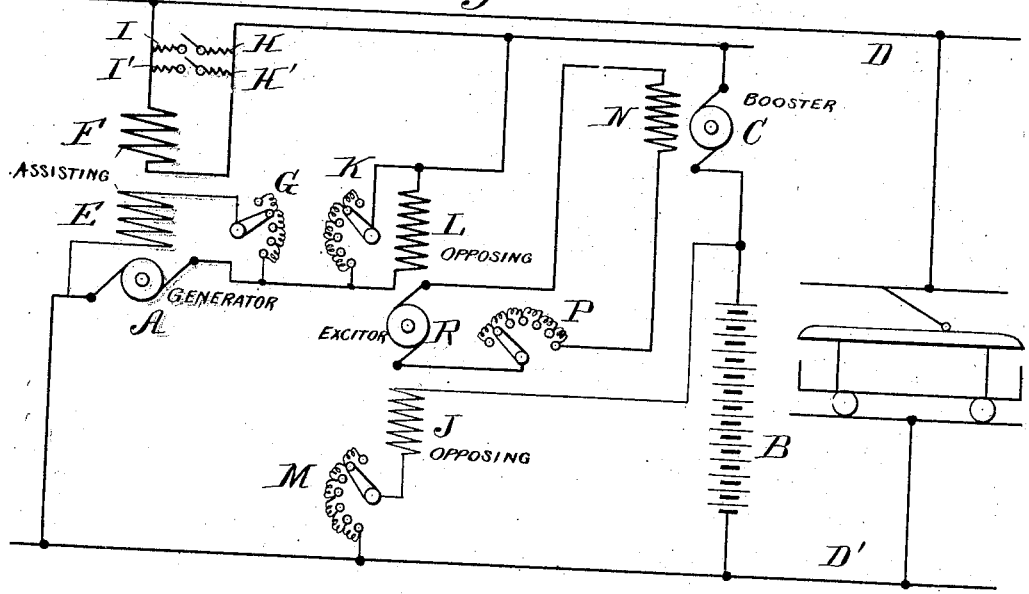

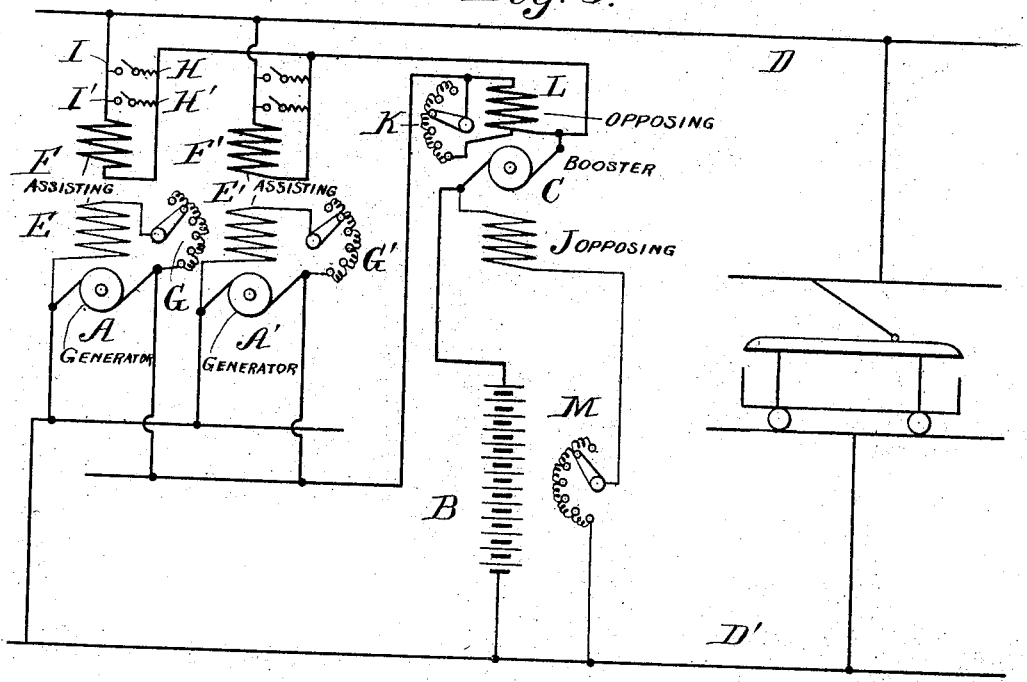

UNITED STATES PATENT OFFICE.

ALBERT S. HUBBARD, OF GREENWICH, CONNECTICUT, AND EDWARD LYNDON, OF NEW YORK, N. Y., ASSIGNORS TO GOULD STORAGE BATTERY COMPANY, OF NEW YORK, N. Y., A CORPORATION OF NEW YORK.

SELF-REGULATING SYSTEM OF ELECTRICAL DISTRIBUTION.

No. 826,429.   Specification of Letters Patent.   Patented July 17, 1906.

Application filed November 3, 1903. Serial No. 179,660.

*To all whom it may concern:*

Be it known that we, ALBERT S. HUBBARD, residing in Greenwich, in the county of Fairfield and State of Connecticut, and EDWARD LYNDON, residing in the borough of Manhattan, city, county, and State of New York, citizens of the United States, have invented a new and useful Self-Regulating System of Electrical Distribution, of which the following is a specification.

Our invention relates to regulating systems of electrical current distribution comprising auxiliary devices, such as a storage battery and booster, inserted in the system to react in response to fluctuations of the load as represented by amperes and prevent the greater part of the same from reaching the generator. In such systems in which the generator runs at an approximately constant load and the auxiliary devices respond to the load fluctuations the voltage at the generator-station will be approximately constant, while the voltage at the end of the feeders or at the center of distribution will fall as the load on the feeders increases (due to the greater drop therein) as a result of the increased current. Our invention is designed to overcome this and to increase the electromotive force at the generator-station with the increase in load to compensate for the increased drop in the feeders or work-circuit.

In practice it has been common to employ an overcompounded generator in order to raise the potential at the generating-station to compensate for drop in the work-circuit, the electromotive force of the generator being increased by means of a series winding on its field, so that as the load increases the electromotive force of the generator will be increased. When such a system is provided with auxiliary devices, the load changes are mostly absorbed by the auxiliary devices, which react in response thereto and do not reach the generator. The automatic raising of the dynamo voltage is thus prevented, and its overcompounding field-windings are thus rendered in a large measure useless.

Our invention is designed to prevent the occurrence of such conditions by enabling the dynamo to respond to the changes in the work-circuit and to give the whole system a rising voltage characteristic with increasing load, and vice versa.

We have illustrated our invention in the accompanying drawings, showing the manner in which we accomplish this.

Figure 1 of said drawings shows a system embodying our invention. Figs. 2, 3, 4, and 5 show modifications thereof.

In Fig. 1, A indicates the generator, B the storage battery, and C a differentially-wound booster. D D′ indicate the feeders or work-circuit. E indicates a shunt field-winding for the generator, which winding is shown as provided with a rheostatic regulator G. F indicates a series field-winding for the generator, which winding is in series with the load on the work-circuit D D′ and is responsive thereto. The series winding F is adjusted by one or more resistances, as H H′, across the same and controlled as desired by the switches I and I′. J is a field-winding for the booster and is connected to operate differentially with a field-winding L and regulated as desired by the rheostatic controller M. K is a rheostatic regulator in shunt to the winding L for regulating the effect of this winding. The winding L constitutes a field-coil for the booster C and is shown as connected in series between the generator and booster and field-coil F and line D.

In the system as above described and illustrated upon an increase of current in the work-circuit D D′ due to an increase of load this current circulating through coil F causes the voltage of the generator A to rise accordingly. The current in the armature of dynamo A, however, is kept approximately constant through the action of the booster and battery. Upon the current in the work-circuit D D′ falling to the normal for which the battery and booster are set the voltage of dynamo A is reduced to its normal through the action of series field-coil F, and through the action of the booster the battery neither charges nor discharges. Upon a further decrease of current in D D′ below normal the voltage of dynamo A still further decreases, and the battery then charges by the action of the booster.

In practice the current through the booster-coil L does not change more than ten per cent., a greater change being checked by battery action.

The number of cells of battery connected to the circuit may be such that the battery voltage is equal to, greater than, or less than the voltage of the generator, the design of the booster being modified to care for these conditions, being slightly different in each case.

Figure 2:
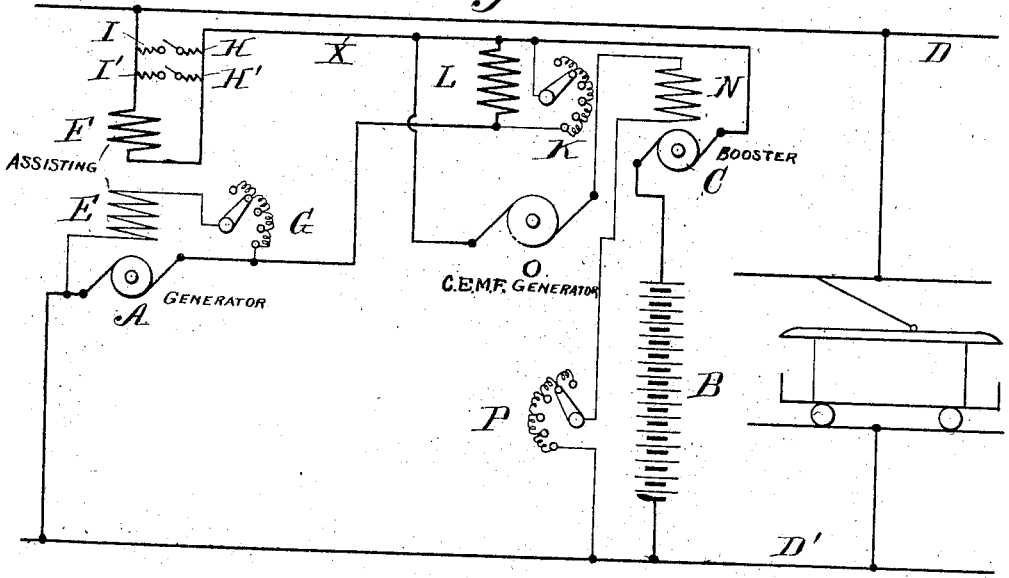

In Fig. 2 is illustrated the same arrangement with another form of booster. In this figure, A is a dynamo having a shunt-field E with rheostatic regulator G and an overcompounding field F with regulating-shunts H H' and shunt-switches I I'. D D' represent the load-circuit, B a storage battery, C a booster having a field N connected in circuit in series relation with a counter-electromotive-force generator O. L is the field of the counter-electromotive-force generator, connected in series between the generator A, field-coil F, and the line D, regulated by the rheostat K. The rising voltage characteristic of A with this system is the same as that obtained with the system illustrated in Fig. 1. The method of obtaining regulation by means of the battery and booster, however, is different. In Fig. 2 the booster C is provided with a field-winding N, connected across the line between X and D' or other suitable points and containing in its circuit the counter-electromotive-force generator O, the electromotive force or potential difference at the terminals of which varies in accordance with the current in the field-winding L. In calculating a booster-battery installation for this modification of the invention the number of cells may also be such that the battery voltage is equal to, less than, or greater than the line voltage, it being simply necessary to calculate for the plant so that for normal load in amperes in L the algebraic sum of the battery and booster voltages must be equal to the voltage of the line.

Fig. 3 illustrates a system wherein an exciter R is used to excite the booster field-winding N, the windings L and J, with their regulators K and M, being arranged to regulate the exciter R. The calculations for this type of booster are the same as for Fig. 1, except that the polarity and voltage of exciter R as determined by windings L and J must be such that when applied to the terminals of N the proper output of C must be obtained.

Fig. 4 illustrates the same system as Fig. 3, excepting that the winding J is connected directly to the battery-terminals.

P in Figs. 2, 3, and 4 is a rheostat by means of which the percentage of load increases or decreases taken by the dynamo may be changed.

Fig. 5 shows two dynamos A and A' connected to operate with the system shown in Fig. 1, it being understood that any number of dynamos may be connected to operate in a similar manner.

By the "work-circuit" is meant that portion of the distributing-lines extending from the junction of the battery and generator leads to and including the translating devices. By the "generator-circuit" is meant that portion of the distributing-lines extending from the generator bus-bars to the junction of the battery-leads with the work-circuit.

By means of our invention as above described the load on the generator is maintained practically constant within certain limits corresponding to the average load on the feeders D D', while the generator is automatically given a rising voltage characteristic with increases in load, and vice versa.

We do not wish to be understood as limiting our invention to any particular form of booster; but,

Having thus described our invention, what we claim as new, and desire to secure by Letters Patent, is—

1. A system of current generation and distribution comprising a generator, a storage battery and booster and a work-circuit, a field-winding for the generator in series in the work-circuit for automatically raising the generator electromotive force when the load on the work-circuit increases and for reducing the generator electromotive force when the load on the circuit decreases.

2. A system of current generation and distribution comprising a generator-circuit, a storage battery and booster and a work-circuit, a field-winding for the generator in series in the work-circuit for varying the generator electromotive force in response to current changes in said circuit.

3. In a regulating system of current generation and distribution, a generator, a work-circuit, and a storage battery and booster to take load fluctuations, said generator having a compound field-winding with the series coil thereof in the work-circuit and responsive to load fluctuations therein.

4. A system of current generation and distribution comprising a generator, a storage battery and booster and a work-circuit, a series coil on the generator responsive to battery action, and causing the generator voltage to rise on increase of load.

5. A system of current generation and distribution comprising a generator-circuit, a storage battery and booster and a work-circuit, and a series coil on the generator in series in the work-circuit and traversed by the currents from the battery and generator to the work-circuit.

6. A system of generation and distribution comprising a generator-circuit, a work-circuit, a storage battery and booster, an exciter for the booster-field in the generator-circuit and responsive to electrical conditions therein, and a series field-coil for the generator in the work-circuit.

7. A system of generation and distribution comprising a generator, a work-circuit, storage battery and booster, an exciter for the booster-field in the generator-circuit, a field-coil for said exciter in series in the generator-circuit, a series field-coil for the generator in series in the work-circuit.

8. In a system of electrical distribution comprising a generator, a work-circuit and auxiliary devices consisting of a battery and booster, means in the work-circuit for varying the electromotive force of the generator, and a counter-electromotive-force generator in circuit with the booster-field and responsive to the load in the generator-circuit.

9. In a system of electrical distribution comprising a generator, a work-circuit, and auxiliary devices consisting of a battery and booster, a field-coil for the generator in series in the work-circut, and a counter-electromotive-force generator in circuit with the booster-field and responsive to the load in the generator-circuit.

10. In a system of electrical distribution comprising a generator, a work-circuit, and auxiliary devices consisting of a battery and booster, means in the work-circuit for varying the electromotive force of the generator, a counter-electromotive-force generator in circuit with the booster-field and responsive to the load in the work-circuit, and a field-coil for said counter-electromotive-force generator in series in the generator-circuit.

11. In a system of electrical distribution comprising a generator, a work-circuit, and auxiliary devices consisting of a battery and booster, a field-coil for the generator in series in the work-circuit, a counter-electromotive-force generator in circuit with the booster-field and responsive to the load in the generator-circuit, and a field-coil for said counter-electromotive-force generator in series in the generator-circuit.

12. In a system of electrical generation and distribution, the combination with a work-circuit of a generator for supplying electric current, said generator having a shunt-winding and means for regulating the strength of this winding, a winding in series with the work-circuit, means for regulating the strength of this winding, a storage battery and booster in series relation, connected across the circuit between the generator and the work-circuit, a winding for the booster connected across the work-circuit and means for regulating the strength of this winding, an additional winding for the booster connected in circuit in series between the generator and the work-circuit, and means for regulating the strength of this winding.

13. In a system of electrical distribution, the combination of a main generator having a shunt-winding and a series winding, a storage battery, and an auxiliary generator, the series winding of the main generator being energized by the algebraic sum of the current from said main generator and the current from the auxiliary generator.

14. In a system of electrical distribution, the combination of a generator, a work-circuit and a storage battery assisting the generator at periods when the generator load exceeds a predetermined value, an auxiliary generator whereby charge and discharge of the battery are assisted, connected thereto, a winding of comparatively coarse wire on the generator-field, and circuit connections whereby the total current output to the work-circuit is passed through the said coarse-wire winding on the generator-fields.

15. In a system of electrical distribution, the combination of a generator, a work-circuit and a storage battery connected thereto which receives charge at periods when the generator load is less than some assigned value and discharges when said load exceeds this value, an auxiliary generator to assist charge and discharge of the battery, a coarse-wire winding on the generator-fields, and circuit connections whereby the combined generator and battery discharge currents are caused to pass through the coarse-wire winding.

16. In a system of electrical distribution, the combination of a generator having shunt and series field-winding, a work-circuit, a storage battery, an auxiliary generator for assisting the battery to charge and discharge, circuits and connections for maintaining the generator-current output substantially constant, and means whereby the generator-field excitation, due to the series winding, varies proportionately to the current output to the work-circuit without necessitating any change in the generator-current.

17. In a system of electrical distribution, the combination of a generator having shunt and series field-windings, a work-circuit, a storage battery, and an auxiliary generator for assisting the charge and discharge of the battery, and circuits and connections whereby the magnetization due to the series winding of the main generator varies proportionately to the current output of the system to the work-circuit.

18. In a system of electrical distribution, the combination of a generator having shunt and series fields, a work-circuit, a storage battery, and an auxiliary generator to assist battery charge and discharge, and circuit connections such that the magnetization of the series field of the main generator is zero when the external load is zero, and varies with variations in the external load.

19. In a system of electrical distribution, the combination of a generator, a work-circuit, a storage battery, an auxiliary generator, a series coil for the main generator, circuits and connections whereby the magnetization of the series coil is proportional to the algebraic sum of the generator and battery currents, considering generator-current and battery discharge as positive quantities, and battery charge as a negative quantity.

20. In a system of electrical distribution, the combination of a generator, a work-circuit, a storage battery, an auxiliary generator, two field-coils for the main generator, and circuits and connections whereby the magnetization of one of said coils is proportional to the sum of generator and battery currents, when the battery is discharging, and is proportional to the difference between said generator and battery currents when the battery is receiving charge while the other of said coils has a substantially constant current.

ALBERT S. HUBBARD.
EDWARD LYNDON.

Witnesses:
L. LITTLEFIELD, Jr.,
JOSEPH STARKENSTEIN.